United States Patent [19]

Chapman, Jr.

[11] Patent Number: 5,508,083
[45] Date of Patent: Apr. 16, 1996

[54] MACHINE DIRECTION FLUTED COMBINED CORRUGATED CONTAINERBOARD

[76] Inventor: Francis L. Chapman, Jr., 100 Morgan Dr., Jesup, Ga. 31545

[21] Appl. No.: 187,398

[22] Filed: Jan. 25, 1994

Related U.S. Application Data

[63] Continuation of Ser. No. 64,495, May 19, 1993, abandoned.
[51] Int. Cl.$^6$ .............................. B32B 3/28; D21F 11/00; B31F 1/20; A01J 21/00
[52] U.S. Cl. ........................ 428/167; 428/192; 162/117; 162/296; 156/244.11; 156/462; 264/286; 264/505; 425/336; 425/396
[58] Field of Search .................... 428/182, 167, 428/184, 192, 156, 120, 141; 162/116, 117, 109, 296; 156/205, 242, 244.11, 257, 462; 264/177.1, 177.16, 286, 505; 425/336, 363, 369, 394, 396

[56] References Cited

U.S. PATENT DOCUMENTS

| 654,884 | 7/1900 | Ferres | 156/462 |
|---|---|---|---|
| 1,199,508 | 9/1916 | Swift | 428/182 |
| 1,550,648 | 8/1925 | Perry | 162/117 |
| 2,793,676 | 5/1957 | Hubmeier | 156/462 |
| 2,960,145 | 11/1960 | Ruegenberg | 264/286 |
| 3,002,876 | 10/1961 | Rosati | 485/336 |

(List continued on next page.)

FOREIGN PATENT DOCUMENTS 1216259  12/1970  United Kingdom ................... 264/286

OTHER PUBLICATIONS

"Non-Tearing Avial Corrugation May Become A Reality", Paperboard Packaging /Apr. 1983/ pp. 71–74 (J. H. Yoke Article).
"First Commercial Application of Longitudinal Corrugation" Boxboard Containers /Mar. 1969/ pp. 65–68.
"Will This Man Change" Boxboard Containers /May 1966 pp. 88–89.
"The Kellicut Corrugator Hopes To Start A Revolution–Here is a report on the Ammunition"–Paperboard Packaging, Aug. 1969 pp. 24–25.
"The Compression Strength Of A Corrugated Board Box" pp. 9–25.
Rok 41 Implications For Linerboard Producers: Tappi Journal Jan. 1993 pp. 158–163.
"Papermaking And Paperboard Making" Second Edition vol. III Pulp and Paper Manufacture/ pp. 184–186.
"Pulp and Paper Chemistry and Chemical Technology" Second Edition Revised And Enlarged–pp. 664–670.
Pulp and Paper Science & Technology vol. II Paper Prep. Under The Direction Of The Joint Text book Com. of The Paper Ind. pp. 166–167.

*Primary Examiner*—Doanld J. Loney
*Attorney, Agent, or Firm*—Louis T. Isaf; James A. Witherspoon

[57] ABSTRACT

Provided is an improved corrugated containerboard that includes a corrugated medium sandwiched between and secured to a top liner and a bottom liner. The corrugated medium, top liner, and bottom liner each include fibers that are oriented in a machine direction, and the corrugated medium defines a plurality of flutes that are oriented in the machine direction. The improved corrugated containerboard is constructed from conventional paperboard which is drawn through a corrugation system in the machine direction. A first piece of paperboard is drawn between a pair of dies to form the corrugated medium with flutes oriented in the machine direction. A second and third piece of paperboard are glued to either side of the corrugated medium to form the corrugated containerboard. Each die includes an engaging surface with ridges thereon, and the engaging surfaces are opposed and define a forming zone therebetween which the first piece of paperboard is drawn through. The first piece of paperboard is drawn into the forming zone at the front of the dies, and the front of the dies is tapered so that the formation of the flutes is staggered.

38 Claims, 3 Drawing Sheets

U.S. PATENT DOCUMENTS

| | | | |
|---|---|---|---|
| 3,024,496 | 3/1962 | Colombo | 264/286 |
| 3,178,494 | 4/1965 | Tisdale | 156/462 |
| 3,220,057 | 11/1965 | Walton | 18/19 |
| 3,245,121 | 4/1966 | Gräff | 264/286 |
| 3,308,006 | 3/1967 | Kresse et al. | 428/182 |
| 3,425,888 | 2/1969 | Kellicutt | 156/593 |
| 3,431,162 | 3/1969 | Morris | 428/182 |
| 4,033,709 | 7/1977 | Kroyer | 425/224 |
| 5,022,963 | 6/1991 | Porter et al. | 162/116 |

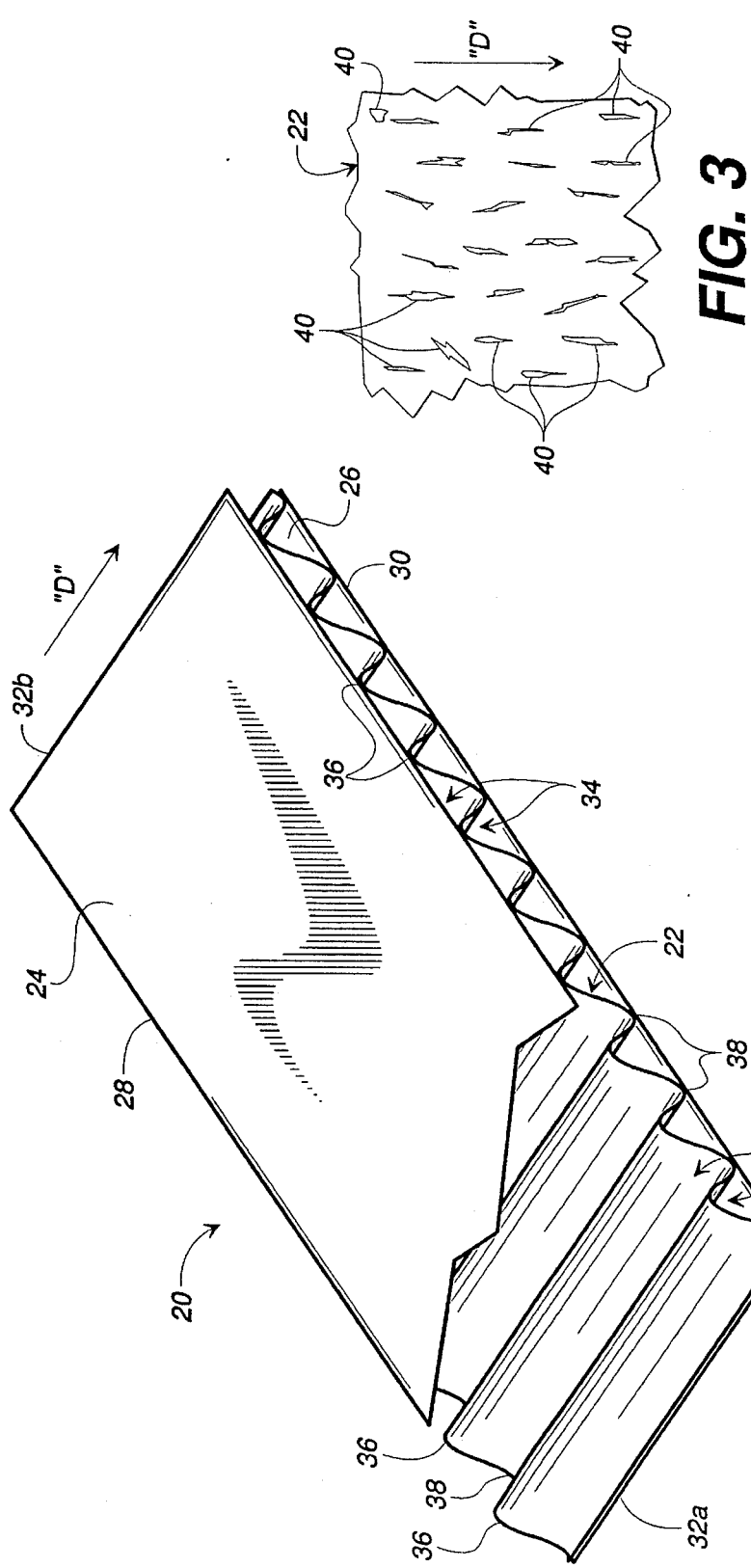
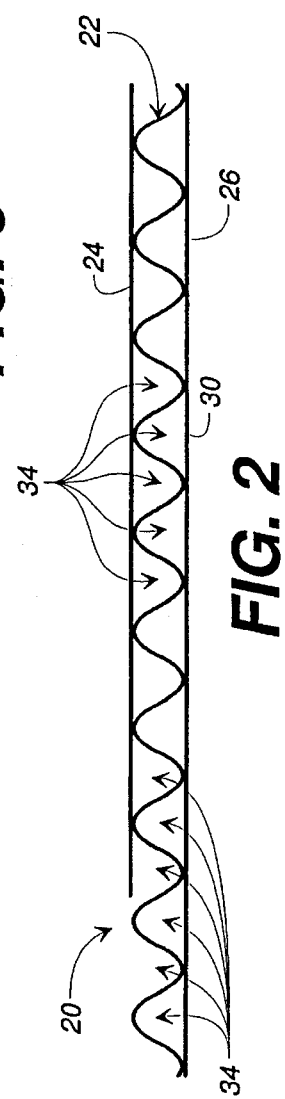
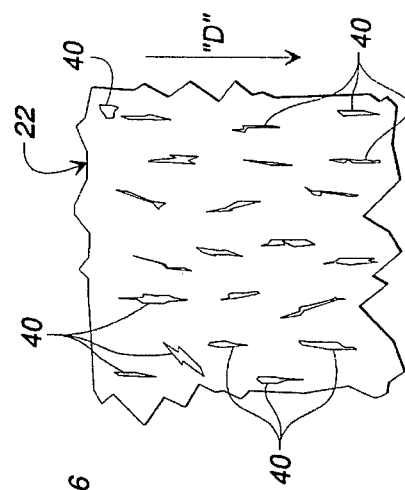
FIG. 1
FIG. 2
FIG. 3

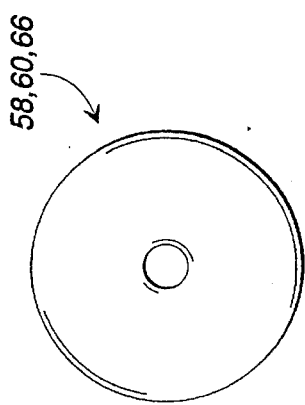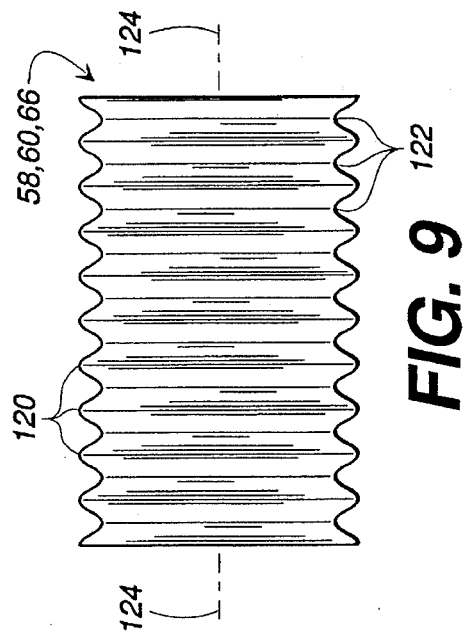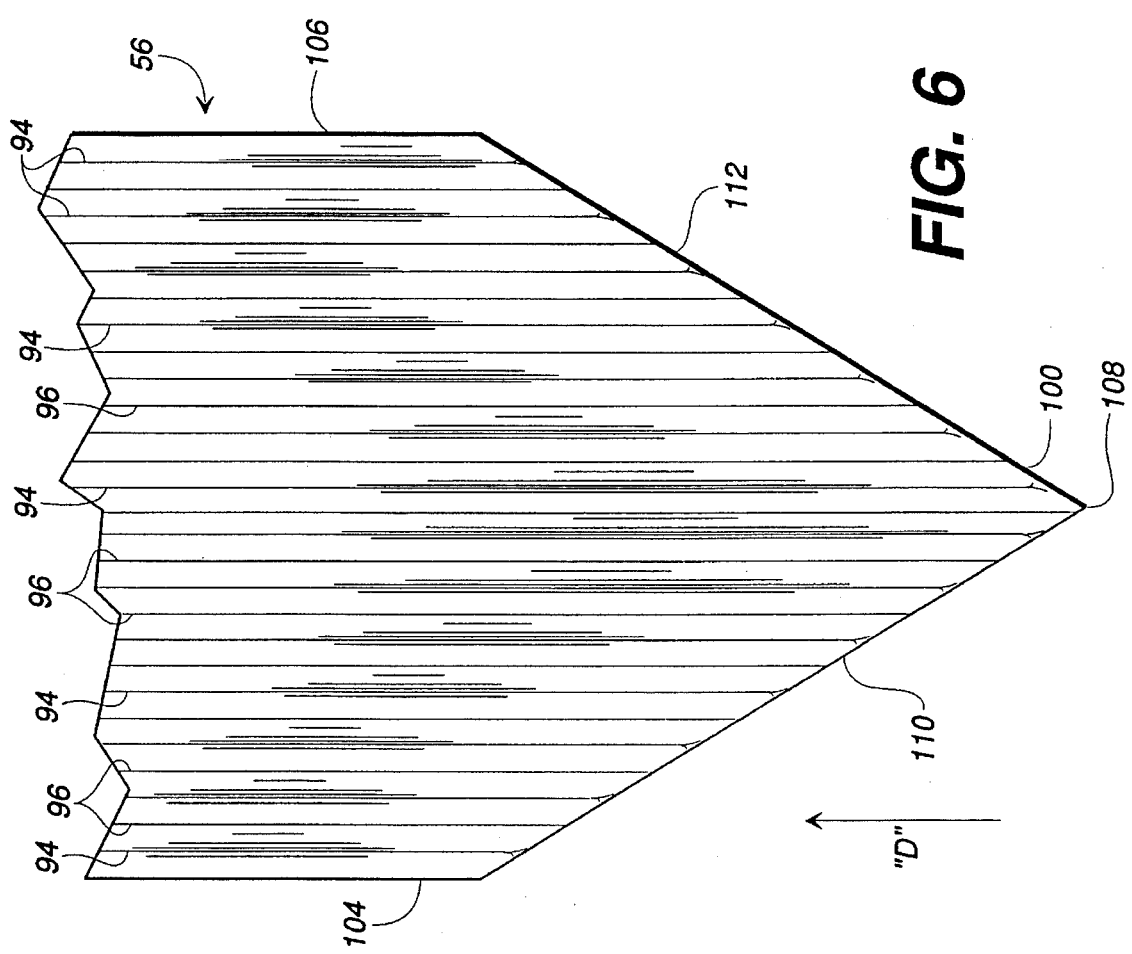

MACHINE DIRECTION FLUTED COMBINED CORRUGATED CONTAINERBOARD

CROSS REFERENCE TO RELATED APPLICATION

This is a continuation of application Ser. No. 08/064,495, filed May 19, 1993, and abandoned.

BACKGROUND OF THE INVENTION

The present invention relates generally to the field of pulp and paper technology, and, in its most preferred embodiments, to the field of corrugated containerboard.

Corrugated boxes, which are used to package a variety of goods, are commonly stacked upon one another. Corrugated boxes which are stacked must have sufficient stacking strength to maintain their shape while supporting the corrugated boxes, with goods therein, stacked above them. Therefore, corrugated boxes are commonly constructed so as to utilize the strength of corrugated containerboard. Corrugated containerboard typically includes a corrugated medium that is sandwiched between a top liner and a bottom liner. Alternatively, some types of corrugated containerboard include only a corrugated medium and a top liner, while other types of corrugated containerboard include only a corrugated medium and a bottom liner. Typically, the top liner and bottom liner are planar pieces of paperboard while the corrugated medium is a fluted piece of paperboard. Corrugated boxes constructed from corrugated containerboard, with the flutes oriented vertically, have great stacking strength.

Paperboard that is acceptable for the fabrication of corrugated containerboard is fabricated by paper machines. For example, paperboard is fabricated by preparing a dilute (0.1%–1.0%) suspension of suitably prepared wood fiber in a head-box. The dilute suspension is continuously deposited from the head-box onto a moving endless belt constructed of screen, wire, or fabric. The belt is carried by at least two large rolls. Water in the dilute suspension freely drains through the belt leaving a somewhat non-uniform mat of interwoven fibers upon the belt. Water is further removed from the mat of fibers on the belt by various vacuum devices so that the mat of fibers becomes a continuous wet web that is approximately 20% fiber. As the wet web reaches the end of the belt it is sufficiently coherent to support itself across a short gap and be picked up by another endless belt constructed of felt-like material. The felt-like belt carries the web into a mechanical press or presses which remove additional water. The web is approximately 40% fiber when leaving the mechanical presses and the felt-like belt. When the web leaves the felt-like belt it is strong enough to support itself and be drawn through dryers. The dryers are heated cylinders which dry the web to form paperboard which is approximately 94% fiber.

In accordance with the above method, a continuous sheet of paperboard is formed in the "machine direction". The machine direction is defined by the direction in which fibers pass through the paper machine. In other words, the machine direction is the direction from the head-box toward and through the heated cylinders. As fibers pass though the paper machine in the machine direction, the fibers bond to form a strong paperboard. Several factors play a role in the bonding of the fibers. These include the drying that takes place and also the fact that, as the web passes through the dryers, the web is tensioned. The tension, in combination with the drying, causes the fibers to come into intimate contact, and the majority of the fibers align in the machine direction. Thus, the "machine direction" also indicates the direction in which the majority of the fibers within a piece of paperboard are aligned. As a result of the alignment of the fibers, the paperboard has a greater strength in the machine direction than it does in the cross-machine direction (i.e., 90 degrees to the machine direction).

As specified above, corrugated containerboard typically includes a corrugated medium that is sandwiched between a top liner and a bottom liner. The top and bottom liner are paperboard that is fabricated in the manner described above. The corrugated medium is constructed from a corrugating medium which is also paperboard fabricated as described above. It is typical for the fabrication of the liner and the corrugating medium to vary slightly so that the liner is stronger than the corrugating medium, and the corrugating medium is stiffer than the liner. For example, the liner is typically fabricated from pine trees whereas the corrugating medium is typically fabricated from hardwood trees. Other differences between the corrugating medium and liner should be understood by those reasonably skilled in the art.

The corrugated medium is commonly formed by passing, in the machine direction, a continuous sheet of corrugating medium through a pair of corrugating rolls which are oriented perpendicularly to the machine direction. The corrugating rolls are typically cylindrical rolls having protruding, rounded teeth. Each tooth is an elongated protrusion that runs from one end to the other of a corrugating roll such that each tooth is parallel to the axis of the corrugating roll. The teeth of the pair of corrugating rolls mesh snugly and the corrugating medium passes through a nip defined between the pair of corrugating rolls such that the corrugating medium is fluted to form the corrugated medium. Flutes add strength in the direction parallel to the flutes. Conventionally, the flutes are formed perpendicularly to the machine direction of the corrugated medium. As indicated above, paperboard (and thus the corrugated medium) has a greater strength in the machine direction than it does in the cross-machine direction. Thus, the strength that is added by the flutes is not aligned with the greater strength that is attributable to the machine direction of the corrugated medium.

Once the corrugated medium is formed, the corrugated containerboard is formed by sandwiching, and securing with glue, the corrugated medium between a top liner and bottom liner. The corrugated containerboard is conventionally formed such that the machine directions of the liners and corrugated medium are parallel. However, the flutes end up being oriented in the cross-machine direction. As indicated above, paperboard (and thus the liners and corrugated medium) has a greater strength in the machine direction than it does in cross-machine direction. Thus, the component of strength that is attributable to the flutes is oriented perpendicularly to the greater components of strength that are attributable to the machine direction of the liners and corrugated medium. Thus, the maximum potential stacking strength of the corrugated containerboard is not realized.

A conventional method of obtaining stronger corrugated containerboard is to increase the fiber content of the corrugated containerboard. The fiber content of the corrugated containerboard is increased by increasing the amount of pulp that is utilized in the process of fabricating the paperboard from which the corrugated containerboard is fabricated. Thus, the consumption of more natural resources is required which increases the cost of the corrugated containerboard and is, arguably, detrimental to the environment.

There is, therefore, a need for an improved corrugated containerboard, and a method and apparatus for fabricating the improved corrugated containerboard, which address these and other related, and unrelated, problems.

SUMMARY OF THE INVENTION

Briefly described, the present invention includes an improved corrugated containerboard, and a method and an apparatus for fabricating the improved corrugated containerboard. In a broad sense, the invention defines corrugated containerboard which includes elongated flutes that extend in the machine direction. The elongated flutes are formed in the machine direction by drawing corrugating medium between a pair of opposed dies.

In accordance with the preferred embodiment of the present invention, the corrugated containerboard includes a corrugated medium sandwiched between and secured to a top liner and a bottom liner. The corrugated medium, top liner, and bottom liner each include fibers that are oriented in a common machine direction. The corrugated medium defines a plurality of flutes that are also oriented in the machine direction. Alternate embodiments of the present invention include similar, but single-backed, corrugated containerboard.

In accordance with the preferred embodiment of the present invention, corrugated containerboard is constructed from corrugating medium, top liner, and bottom liner by an improved corrugation system. The corrugating medium, top liner, and bottom liner are previously-manufactured paperboard. The corrugation system draws the corrugating medium between a pair of dies in the machine direction. The dies flute the corrugating medium in the machine direction to form the corrugated medium. The corrugated medium is drawn from the dies into the nip defined between a first pair of rolls that are circumferentially grooved. The corrugated medium is drawn from the first pair of rolls past a fluted carrier plate and a first glue applicator that applies glue to the top side of the corrugated medium. The top liner is joined, in the machine direction, to the glued side of the corrugated medium and is passed therewith through the nip defined between a second pair of rolls to form a single-backed corrugated containerboard. One of the second pair rolls is smooth and engages the top liner, and the other is circumferentially grooved and engages the corrugated medium. The single-backed corrugated containerboard is drawn past a second glue applicator which applies glue along the bottom side of the corrugated medium. The bottom liner is joined to the bottom side of the corrugated medium and is passed therewith through the a space defined between a continuous belt and a heater, in a conventional manner, to form the corrugated containerboard (i.e., double-backed corrugated containerboard). The heater functions to ensure that the glue is properly set.

During start-up operation of the corrugation system, the dies and first pair of rolls are drawn apart and the corrugating medium is passed freely therebetween and drawn through the nip of the second pair of rolls. Subsequently, the dies and first pair of rolls are gradually drawn together to initiate fabrication of the corrugated medium.

According to the prefixed embodiment of the present invention, each of the dies includes a die front and an engaging surface. The dies are oriented such that the engaging surface of one die opposes the engaging surface of the other die so that a forming zone is defined therebetween. The engaging surfaces are contoured by a plurality of ridges which define die flutes therebetween. The dies are constructed from material from which it is possible to form low friction, abrasion resistant engaging surfaces.

The corrugating medium passes through the forming zone from the die front, passes through the forming zone in the machine direction, and engages the engaging surfaces. The engaging surfaces flute the corrugating medium and thereby transform the corrugating medium into corrugated medium. The die fronts are tapered such that the formation of the flutes is staggered. The staggering functions to allow movement of the corrugating medium into the forming zone at right angles to the machine direction while the corrugating medium is drawn into the forming zone in the machine direction. In other words, as the corrugating medium is drawn through the forming zone in the machine direction, the corrugating medium effectively "flows", at right angles to the machine direction, into the forming zone along the tapered die fronts. Thus, the width of the corrugating medium is greater than the width of the corrugated medium.

In accordance with the preferred embodiment of the present invention, the grooves of a given circumferentially grooved roll are perpendicular to the axis of the roll. Also, the circumferentially grooved rolls are properly shaped to effectively mate with the corrugated medium.

It is therefore an object of the present invention to provide an improved corrugated containerboard.

Another object of the present invention is to provide a method and apparatus for fabricating improved corrugated containerboard.

Yet another object of the present invention is to provide a containerboard that, per weight, has stronger stacking strength than conventional corrugated containerboard.

Still another object of the present invention is to provide an improved corrugated containerboard that is fluted in the machine direction.

Still another object of the present invention is to provide a method and an apparatus for fluting corrugating medium in the machine direction.

Still another object of the present invention is to provide dies with contoured surfaces for fluting corrugating medium in the machine direction.

Still another object of the present invention is to provide dies for fluting corrugating medium in the machine direction, wherein the dies are tapered such that the formation of flutes in the corrugating medium is staggered.

Other objects, features and advantages of the present invention will become apparent upon reading and understanding this specification, taken in conjunction with the accompanying drawings.

BRIEF DESCRIPTION OF THE DRAWINGS

FIG. 1 is a perspective, cut-away view of corrugated containerboard in accordance with the preferred embodiment of the present invention.

FIG. 2 is a front elevational view of the corrugated containerboard of FIG. 1.

FIG. 3 depicts a greatly enlarged, isolated, representative, plan view of a portion of the corrugated medium in accordance with the preferred embodiment of the present invention.

FIG. 6 is a cut-away, plan view of an engaging surface of the lower die of FIG. 5.

FIG. 8 an end view of a circumferentially grooved roll which is part of the corrugation system of FIG. 4, in accordance with the preferred embodiment of the present invention.

FIG. 9 is front view of the circumferentially grooved roll of FIG. 8.

DETAILED DESCRIPTION OF THE PREFERRED EMBODIMENTS

Figure 4:
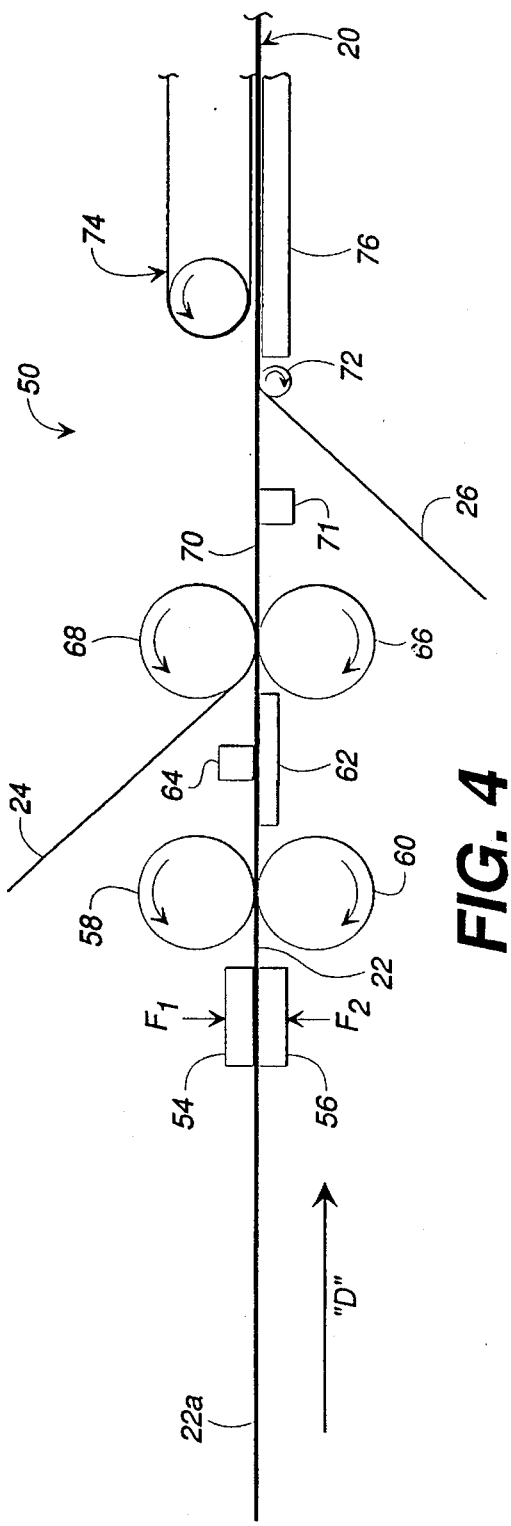
FIG. 4 is a schematic view of a corrugation system in accordance with the preferred embodiment of the present invention.

Referring now in greater detail to the drawings, in which like numerals represent like components throughout the several views, FIG. 1 shows a perspective, cut-away view of corrugated containerboard 20, in accordance with the preferred embodiment of the present invention. The corrugated containerboard 20 includes a corrugated medium 22 that is sandwiched between a top liner 24 and a bottom liner 26. The corrugated medium 22, top liner 24, and bottom liner 26 define a machine direction which is indicated by arrow "D", and is discussed in detail below. The corrugated containerboard 20 further includes an upstream edge 28, downstream edge 30, and a pair of side edges 32a, b. The corrugated medium 22 defines a plurality of flutes 34 and includes a plurality of upper apexes 36 and lower apexes 38. Only a few flutes 34 and apexes 36,38 are specifically pointed out in FIG. 1 in an effort to clarify the view. The flutes 34 are, in accordance with the preferred embodiment, parallel to the machine direction "D". The top liner 24 and bottom liner 26 are attached to the upper apexes 36 and lower apexes 38, respectively.

FIG. 2 is an elevational view of the downstream edge 30 of the corrugated containerboard 20 of FIG. 1. It is thought that the flutes 34 are more clearly seen in FIG. 2. In accordance with the preferred embodiment of the present invention, flutes 34 are defined in both sides of the corrugated medium 22. Variously spaced, shaped, and sized flutes 34 are within the scope of the present invention. Also, in accordance with the preferred embodiment of the present invention, the corrugated medium 22 defines a multi-cycle sinusoidal shape which is seen in an elevational view of the downstream edge 30 of the corrugated containerboard 20.

FIG. 3 depicts a greatly enlarged, isolated, representative, plan view of a portion of the corrugated medium 22, in accordance with the preferred embodiment of the present invention. As discussed below, the corrugated medium 22 is, in accordance with the preferred embodiment of the present invention, paperboard and includes a plurality of fibers 40. FIG. 3 depicts only a few fibers 40 in an effort to clarify the relationships explained herein. As shown, a majority of the fibers 40 define an elongated shape and are oriented in a parallel fashion. The direction in which the majority of the fibers 40 are oriented defines the machine direction "D" of the corrugated medium 22. As specified above, the flutes 34 (FIGS. 1 and 2) are parallel to the machine direction "D". Likewise, in accordance with the preferred embodiment of the present invention, the top liner 24 and bottom liner 26 are paperboard and similarly define a machine direction that is parallel to the machine direction "D" of the corrugated medium 22.

In accordance with the preferred embodiment of the present invention, the corrugated containerboard 20 functions, in some ways, superiorly to conventional corrugated containerboard (not shown). For example, a corrugated box constructed, with flutes vertically oriented, from corrugated containerboard 20 (FIGS. 1 and 2) will have greater stacking strength than a similarly designed corrugated box, with flutes vertically oriented, constructed from conventional corrugated containerboard. (It is assumed in this example that each box has the same fiber content (i.e., mass).) Therefore, boxes manufactured from the invented corrugated containerboard 20 can have the same stacking strength as boxes fabricated from conventional corrugated containerboard, while having less fiber content.

Referring back to FIG. 1, the present inventor has discovered that superior stacking strength of the corrugated containerboard 20 is accomplished by orienting the flutes 34 parallel to the machine direction "D" of the corrugated medium 22, top liner 24, and bottom liner 26. In this configuration, the maximum components of strength attributable to the flutes 34 and fibrous bonding (i.e., machine direction "D") are accumulated. Components of strength are not so accumulated in conventional containerboard, as is discussed in the Background Of The Invention section of this specification.

FIG. 4 is a schematic view of an advanced corrugation system 50 that functions to fabricate corrugated containerboard 20 (see also FIGS. 1 and 2), in accordance with the preferred embodiment of the present invention. In accordance with the preferred embodiment of the present invention, the corrugation system 50 fabricates corrugated containerboard 20 from corrugating medium 22a, top liner 24, and bottom liner 26. The corrugating medium 22a and liners 24,26 are, in accordance with the preferred embodiment of the present invention, a finished paperboard product and are not merely masses of fiber. For example, suitable paperboard is fabricated in a conventional manner as described above in the Background Of The Invention section of this specification. It is the formation of the paperboard that dictates the machine direction "D" of the corrugated medium 22, top liner 24, and bottom liner 26, as should be understood by those reasonably skilled in the art.

The corrugating medium 22a, top liner 24, and bottom liner 26 are drawn through the corrugation system 50 in the machine direction "D". Corrugating medium 22a is first drawn between and past an upper die 54 and lower die 56. The dies 54,56 are forced toward one another (see FIG. 5) and engage the corrugating medium 22a. The dies 54,56 form flutes 34 (FIGS. 1 and 2) on the corrugating medium 22a such that the corrugating medium 22a is transformed into corrugated medium 22, as is discussed below. The corrugated medium 22 is drawn from the dies 54,56 into the nip defined between a first circumferentially grooved roll 58 and second circumferentially grooved roll 60. The first grooved roll 58 and second grooved roll 60 engage and provide, in part, the motive force that draws corrugating medium 22a between the dies 54,56. The first grooved roll 58 and second grooved roll 60 also assist in maintaining the shape of the corrugated medium 22. As is discussed below, the surfaces of the first grooved roll 58 and second grooved roll 60 complement the shape of the corrugated medium 22. In accordance with the preferred embodiment of the present invention, the first grooved roll 58 and second grooved roll 60 are forced toward one another and heated such that the corrugated medium 22 is permanently shaped upon exiting the nip defined between the first grooved roll 58 and second grooved roll 60.

The corrugated medium 22 is drawn from the first grooved roll 58 and second grooved roll 60 and engages a fluted carrier plate 62 and a first glue applicator 64. The fluted carrier plate 62 is disposed below the corrugated medium 22, and the corrugated medium 22 slides across the fluted carder plate 62. The surface (not shown) of the fluted carrier plate 62 that engages the corrugated medium 22 is fluted in the machine direction "D". The flutes (not shown) of the carrier plate 62 are sized and oriented so as to cooperate with the corrugated medium 22 and assist in keeping the corrugated medium 22 properly aligned within the corrugation system 50. In accordance with an alternate embodiment of the present invention, a vacuum (not shown) is employed to ensure engagement between the corrugated medium 22 and the fluted carrier plate 62. In accordance with the preferred embodiment of the present invention, the first glue applicator 64 is positioned above the corrugated medium 22 and applies glue (not shown) along the upper apexes 36 (FIG. 1) of the corrugated medium 22. The first glue applicator 64 includes, for example, a glue roll (not shown) and functions to apply glue so as to facilitate the formation of corrugated containerboard 20, as should be understood by those reasonably skilled in the art upon understanding this disclosure.

The corrugated medium 22 is drawn past the fluted carrier plate 62 and the first glue applicator 64, and into the nip defined between a third circumferentially grooved roll 66 and a first smooth roll 68. The third grooved roll 66 is positioned below the corrugated medium 22 and the first smooth roll 68 is positioned above the corrugated medium 22. The third grooved roll 66 and the first smooth roll 68 engage the corrugated medium 22 and the top liner 24, respectively, and provide, in part, the motive force that draws the corrugated medium 22 and the top liner 24 through the corrugation system 50. The top liner 24 is engaged to the glued upper apexes 36 (FIG. 1) of the corrugated medium 22 such that a single-backed corrugated containerboard 70 is formed, as should be understood by those reasonably skilled in the art upon understanding this disclosure. The third grooved roll 66 and first smooth roll 68 are discussed in greater detail below. The single-backed corrugated containerboard 70 is drawn past a second glue applicator 71 that is positioned below the single-backed corrugated containerboard 70 and applies glue (not shown) along the lower apexes 38 (FIG. 1) of the corrugated medium 22. The glue applicator includes, for example, a glue roll (not shown) and functions to apply glue so as to form corrugated containerboard 20, as should be understood by those reasonably skilled in the art upon understanding this disclosure. The single-backed containerboard 70 and bottom liner 26 are drawn past a guide roll 72 where the bottom liner 26 is engaged to the glued lower apexes 38 (FIG. 1) of the single-backed containerboard 70. The containerboard 70, with the bottom liner 26 engaged thereto, is drawn between a blanket-belt assembly 74 and a heater 76 such that corrugated containerboard 20 (i.e., double-backed corrugated containerboard) is formed, as should be understood by those reasonably skilled in the art upon understanding this disclosure. The blanket-belt assembly 74 and heater 76 (which are partially cut-away in FIG. 4) and the guide roll 72 are conventional, and function in a conventional manner, as should be understood by those reasonably skilled in the art. Likewise, the corrugated containerboard 20 is discharged from the corrugation system 50 in a conventional manner.

In accordance with an alternate embodiment of the present invention, the second glue applicator 71 is selectively not employed and the bottom liner 26 is not drawn into the corrugation system 50 such that single-backed containerboard 70 is fabricated. Single-backed corrugated containerboard 70 would include, for example, the top liner 24 (FIGS. 1 and 2) attached to the corrugated medium 22 (FIGS. 1–3), without the bottom liner 26 (FIGS. 1 and 2) attached thereto.

The above describes steady-state operation of the corrugation system 50. Start-up operation of the corrugation system 50 varies from the steady-state operation. In accordance with the preferred embodiment of the present invention, at "start-up", the corrugation system 50 functions to draw the dies 56,54 away from each other, and draw the first grooved roll 58 away from the second grooved roll 60. Then, the end of a piece of corrugating medium 22a is drawn into the nip defined between the third grooved roll 66 and first smooth roll 68. The third grooved roll 66 and first smooth roll 68 engage the corrugating medium 22a and provide motive force which draws the corrugating medium 22a through the corrugation system 50. As the corrugating medium 22a is drawn through the corrugation system 50, the dies 54,56 are slowly drawn toward one another such that there is a gradual transition from forming no flutes 34 (FIGS. 1 and 2) to forming flutes 34. Once the flutes 34 are formed, the first grooved roll 58 and second grooved roll 60 are drawn together, and the top liner 24 and the bottom liner 26 are drawn into the corrugation system 50.

Figure 5:
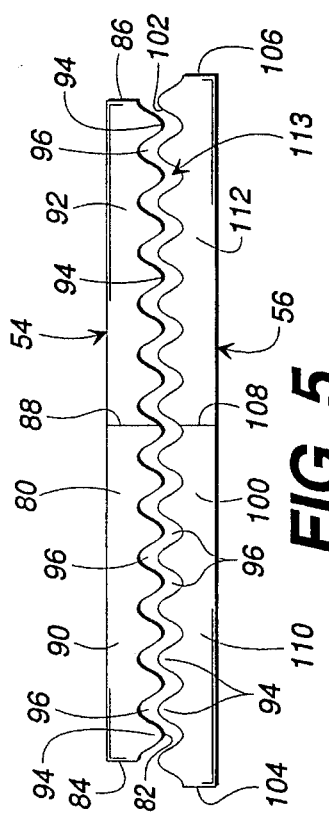
FIG. 5 front elevational view of dies which are part of the corrugation system of FIG. 4, in accordance with the preferred embodiment of the present invention.

FIG. 5 is a front elevational view of the dies 54,56, in accordance with the preferred embodiment of the present invention. The upper die 54 includes a front 80, an engaging surface (or die face) 82, a first side 84, and a second side 86. The front 80 of the upper die 54 includes a tip 88, a first edge 90, and a second edge 92. The engaging surface 82 of the upper die 54 includes a plurality of ridges 94 which define die flutes 96 therebetween. Only a selected few of the ridges 94 and die flutes 96 are pointed out in FIG. 5 in an effort to clarify the view.

In accordance with the preferred embodiment of the present invention, the lower die 56 includes a front 100, an engaging surface (or die face) 102, a first side 104, and a second side 106. The front 100 of the lower die 56 includes a tip 108, a first edge 110, and a second edge 112. The engaging surface 102 of the lower die 56 includes a plurality of ridges 94 which define die flutes 96 therebetween. As specified above, only a selected few of the ridges 94 and die flutes 96 are pointed out in FIG. 5 in an effort to clarify the view. As shown, the ridges 94 of the upper die 54 protrude into the die flutes 96 of the lower die 56, and the ridges 94 of the lower die 56 protrude into the die flutes 96 of the upper die 54. Defined between the engaging surface 82 of the upper die 54 and the engaging surface 102 of the lower die 56, as they are oriented in FIG. 5, is a forming zone 113.

FIG. 6 is a cut-away, plan view of the engaging surface 102 of the lower die 56, in accordance with the preferred embodiment of the present invention. In accordance with the preferred embodiment, the ridges 94 and die flutes 96 extend along the length of the lower die 56. Also, the first edge 110 tapers between the tip 108 and the first side 104, and the second edge 112 tapers between the tip 108 and the second side 106.

Figure 7:
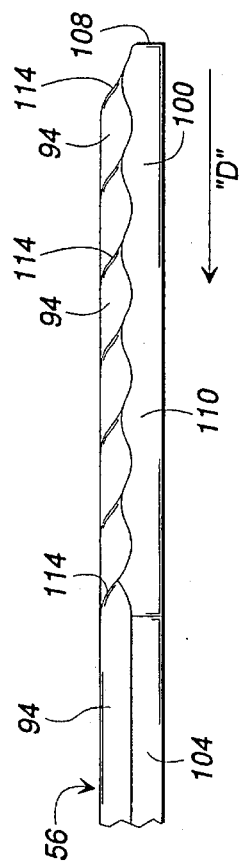
FIG. 7 is a side elevational view of the lower die of FIG. 5.

FIG. 7 is an elevational view of the first side 104 of the lower die 56, in accordance with the preferred embodiment of the present invention. As seen, each ridge 94 includes a rounded leading edge 114 at the front 100. Only a selected few of the ridges 94 and leading edges 114 are specifically pointed out in FIG. 7 in an effort to clarify the view. While not all of the ridges are seen in FIG. 7, it should be understood that each ridge 94 includes a rounded leading edge 114. Likewise, it should be understood that the upper die 54 is very similar to the lower die 56. Dies 54,56 of various sizes, with various numbers of variously shaped and spaced ridges 94, are within the scope of the present invention.

As specified with reference to FIG. 4 above, the dies 54,56 engage the corrugating medium 22a and form flutes 34 (FIGS. 1 and 2) on the corrugating medium 22a to form the corrugated medium 22. Referring to FIG. 5, the corrugation system 50 (FIG. 4) draws a "continuous" sheet of corrugating medium 22a (FIG. 4) through the forming zone 113 (FIG. 5) such that corrugating medium 22a enters at the fronts 80,100 of the dies 54,56 and exits at the side opposite (not shown) from the fronts 80,100 (i.e., at the "rear"). The rounded leading edges 114 (FIG. 7) facilitate the smooth entry of corrugating medium 22a into the forming zone 113. Thus, the machine direction "D" (FIGS. 4, 6 and 7) is from the fronts 80, 100 of the dies 54,56 toward the rear of the dies 54,56.

Referring further to FIG. 5, as corrugating medium 22a (FIG. 4) passes through the forming zone 113, the dies 54,56 are in close proximity and are forced toward one another (as represented by vectors $F_1$ and $F_2$ of FIG. 4) such that corrugating medium 22a slidingly engages the engaging surfaces 82, 102 and the ridges 94 thereon; whereby flutes 34 (FIGS. 1 and 2) are formed on the corrugating medium 22a. Due to the taper of the edges 90,92, 110, 112, the formation of the flutes 34 is staggered. As a section of corrugating medium 22a enters the forming zone 113, an initial flute 34 is formed on the corrugating medium 22a by the die ridge 94 that is closest to the tips 88,108. Subsequently, the die ridges 96 next closest to the tips 88,108 form flutes 34 in the corrugating medium 22a. This process of successively forming flutes 34 continues as corrugating medium 22a passes into the forming zone 113. The staggering seeks to prevent the damaging of the corrugating medium 22a during formation of the flutes 34. In accordance with the preferred embodiment of the present invention, the edges 90,92, 110, 112 define V-shapes that facilitates the staggering. In accordance with other embodiments of the present invention, the edges 90,92,110,112 define other shapes which allow for the staggered formation of the flutes 34.

The staggering functions to allow movement of the corrugating medium 22a into the forming zone 113 at right angles to the machine direction "D" (FIG. 6) while the corrugating medium 22a is drawn into the forming zone 113 in the machine direction "D". In other words, as the corrugating medium 22a is drawn through the forming zone 113, the corrugating medium 22a effectively "flows", with a component at right angles to the machine direction "D", into the forming zone 113 along the edges 90,92, 110, 112. Thus, as flutes 34 are formed, the width of the corrugating medium 22a is decreased such that the width of the corrugating medium 22a is greater than the width of the corrugated medium 22 (FIG. 4). In accordance with the preferred embodiment of the present invention, the width of the corrugating medium 22a is greater than the width of the corrugated medium 22 and the liners 24,26 (FIG. 4), and the width of the corrugated medium 22 and the liners 24,26 are substantially similar, as should be understood by those reasonably skilled in the art upon understanding this disclosure. This variation in widths can be referred to as "take-up".

According to the preferred embodiment of the present invention, the dies 4,56 are constructed from material from which it is possible to form low friction, abrasion resistant engaging surfaces 82, 102 with ridges 94 thereon. For example, a suitable material for fabrication of the dies 54,56 is a ceramic material. It is also thought, for example, that steel would be suitable. The present invention includes dies 54,56 of various sizes and shapes, and with variously sized, shaped and spaced ridges 94. The size, shape, and spacing of the ridges 94, of course, dictates the size, shape, and spacing of the flutes 34 of the corrugated containerboard 20 (FIGS. 1 and 2) which is fabricated by the corrugation system 50 (FIG. 4).

FIGS. 8 and 9 represent an end view and a front view, respectively, of one of the circumferentially grooved rolls 58,60,66 of the corrugation system 50 (FIG. 4), in accordance with the preferred embodiment of the present invention. The circumferentially grooved rolls 58,60,66 are cylindrical and include a plurality of roll ridges 120 which define a plurality of roll flutes 122. The roll ridges 120 and roll flutes 122 circumvent the circumferentially grooved rolls 58,60,66. Only a selected few of the roll ridges 120 and roll flutes 122 are identified in FIG. 9 in an effort to clarify the view. Each circumferentially grooved roll 58,60,66 defines a roll axis 124. In accordance with the preferred embodiment of the present invention, the roll ridges 120 and roll flutes 122 of a given circumferentially grooved roll 58,60,66 are perpendicular to the roll axis 124. As specified above, the circumferentially grooved rolls 58,60,66 engage and provide motive force to the corrugated medium 22 (FIGS. 1–3). When engaged, the grooved rolls 58,60,66 mate with the flutes 34 (FIGS. 1 and 2) of the corrugated medium 22 such that the roll ridges 120 penetrate into the flutes 34 of the corrugated medium 22, as should be understood by those reasonably skilled in the art upon understanding this disclosure. The roll ridges 120 and roll flutes 122 are sized, shaped, and spaced so as to facilitate secure engagement between the circumferentially grooved rolls 58,60,66 and the corrugated medium 22 without causing damage to the corrugated medium 22. Circumferentially grooved rolls of various sizes, with various numbers of variously shaped and spaced roll ridges 120, are within the scope of the present invention.

In accordance with the preferred embodiment of the present invention, the circumferentially grooved rolls 58,60, 66 are fabricated from materials that are commonly used to fabricate rolls that are used in corrugating machines. The roll ridges 120 and roll flutes 122 can, for example, be acceptably cast or machined into circumferentially grooved rolls 58,60,66. The smooth roll 68 is conventional, as should be understood by those reasonably skilled in the art.

Whereas this invention has been described in detail with particular reference to preferred embodiments and alternate embodiments thereof, it will be understood that variations and modifications can be effected within the spirit and scope of the invention, as described herein before and as defined in the appended claims.

I claim:

1. A die for forming flutes in sheet of previously-manufactured paperboard, the die comprising:

a forward entrance end:

a rearward exit end, wherein a longitudinal direction is defined in a direction defined from said entrance end toward said exit end; and a broad forming surface extending in the longitudinal direction between said entrance end and said exit end, wherein said forming surface defines a plurality of grooves and ridges which are alternating, elongated and extend parallely in the longitudinal direction, wherein each ridge of said plurality of grooves and ridges defines an elongated apex extending longitudinally from proximate to said entrance end rearward to proximate said exit end, and a curved leading edge at said entrance end, wherein said plurality of grooves and ridges are staggered such that as said forming surface is traversed in a lateral direction from a central ridge of said plurality of grooves and ridges, said curved leading edge of each successively encountered ridge of said plurality of grooves and ridges is farther rearward of said curved leading edge of said central ridge, and wherein said plurality of grooves and ridges cooperate to defines a multi-cycle sinusoidal shape such that, in an end elevational view of said die said plurality of grooves and ridges define a multi-cycle sinusoidal shape.

2. The die of claim 1, wherein said curved leading edge of said each ridge is rounded.

3. The die of claim 1, wherein each groove of said plurality of grooves and ridges defines a length and a width, wherein said width is substantially constant along said length.

4. The die of claim 1, wherein said die is generally planar.

5. The die of claim 1, wherein said die defines a length between said entrance end and said exit end, and wherein said sinusoidal shape is substantially constant for the entirety of said length.

6. The die of claim 1, wherein said forming surface is absent of separate parts.

7. The die of claim 1, wherein said die is absent of separately movable parts.

8. The die of claim 1, wherein each groove of said plurality of grooves and ridges defines an elongated nadir extending longitudinally from proximate to said entrance end rearward to proximate said exit end.

9. The die of claim 1, wherein said die further includes an entrance edge at said entrance end, wherein said entrance edge extends obliquely with respect to said longitudinal direction, and wherein said curved leading edges of ridges of said plurality of grooves and ridges extend from proximate to said entrance edge.

10. The die of claim 9, wherein each ridge of said plurality of grooves and ridges further defines a terminus at said exit end, and wherein said die further includes a trailing edge at said exit end, wherein said terminus of each ridge of said plurality of grooves and ridges extends to said trailing edge.

11. The die of claim 1, wherein said die further includes a pair of side edges, wherein said pair of side edges extend longitudinally, a tip at said entrance end, a pair of entrance edges extending rearward from said tip, wherein said entrance edges define an angle of less than 180° therebetween, wherein said entrance edges extend obliquely with respect to said longitudinal direction, wherein a first entrance edge of said pair of entrance edges extends rearward from said tip and joins a first side edge of said pair of side edges, and wherein a second entrance edge of said pair of entrance edges extends rearward from said tip and joins a second side edge of said pair of side edges, and wherein a first plurality of ridges of said plurality of ridges extend rearward from said first entrance edge, and wherein a second plurality of ridges of said plurality of ridges extend rearward from said second entrance edge.

12. The die of claim 11, wherein said die is generally planar.

13. The die of claim 11, wherein said die defines a length between said entrance end and said exit end, and wherein said sinusoidal shape is substantially constant for the entirety of said length.

14. The die of claim 11, wherein said forming surface is absent of separate parts.

15. The die of claim 11, wherein said die is absent of separately movable parts.

16. The die of claim 11, wherein each groove of said plurality of grooves and ridges defines a length and a width, wherein said width is substantially constant along said length.

17. A method of fabricating containerboard from previously-manufactured paperboard, the method comprising steps of:

providing a die,
wherein the die is somewhat planar and includes,
a broad forming surface for contacting a sheet of previously-manufactured paperboard, wherein the forming surface is elongated and thereby defines a longitudinal direction,
a forward entrance end, and
a rearward exit end, wherein the longitudinal direction is defined in a direction defined from the entrance end toward the exit end, and
wherein the forming surface of the die defines a plurality of grooves that are elongated and extend parallely in the longitudinal direction;

providing a plurality of forming members that are rigid, substantially non-rotating, and longitudinally extending, wherein each forming member of the plurality of forming members includes a forward end and a rearward end;

orienting the forming surface of the die and the plurality of forming members in a flute forming position in which
each forming member of the plurality of forming members extends generally parallel to and at least partially into a respective groove of the plurality of grooves to define a forming zone between the forming surface of the die and the plurality of forming members,
the plurality of forming members are laterally and longitudinally offset such that as the plurality of forming members are traversed in a lateral direction from a central forming member of the plurality of forming members, the forward end of each successively encountered forming member of the plurality of forming members is farther rearward from the forward end of the central forming member, and
the rearward end of each forming member of the plurality of forming members is disposed at approximately the same longitudinal position;

drawing the sheet of previously-manufactured paperboard in the longitudinal direction through the forming zone; and maintaining the flute forming position such that
a plurality of longitudinally extending flutes are formed on the sheet of previously-manufactured paperboard, substantially the entire length of each forming member of the plurality of forming members establishes contact with the sheet of previously manufactured paperboard, and as the sheet of previously-manufactured paperboard is drawn longitudinally through the forming zone, the sheet of previously-manufactured paperboard is additionally drawn into the forming zone at right angles to the longitudinal direction due to the formation of the flutes.

18. The method of claim 17, wherein the die and the plurality of forming members are substantially non-moving.

19. The method of claim 17, wherein each groove of the plurality of grooves defines a length and a width, wherein the width is substantially constant along the length.

20. The method of claim 17, wherein the sheet of previously-manufactured paperboard is a first sheet of previously manufactured paperboard and defines a first surface, and where the method of fabricating containerboard further comprises a step of securing a second sheet of previously-manufactured paperboard to the first surface of the first sheet of previously-manufactured paperboard subsequent to the formation of the flutes on the first sheet of previously-manufactured paperboard.

21. The method of claim 20, wherein the step of securing a second sheet includes steps of applying adhesive to the first surface of the first sheet of previously-manufactured paperboard, and engaging the second sheet of previously-manufactured paperboard to the first surface of the first sheet of previously-manufactured paperboard.

22. The method of claim 20, wherein each groove of the plurality of grooves defines a length and a width, wherein the width is substantially constant along the length.

23. The method of claim 17, wherein the sheet of previously-manufactured paperboard is a first sheet of previously-manufactured paperboard and defines a first surface, and wherein the first sheet of previously-manufactured paperboard includes a plurality of paper fibers, wherein the method of fabricating containerboard further comprises, prior to the drawing step, steps of determining the direction in which a majority of the plurality of paper fibers included in the first sheet of previously-manufactured paperboard are generally aligned, and orienting the first sheet of previously-manufactured paperboard such that the majority of the plurality of paper fibers included in the first sheet of previously-manufactured paperboard are generally aligned parallel to the longitudinal direction, whereby the flutes defined by the first sheet of previously-manufactured paperboard are oriented generally parallel to the direction in which the majority of the plurality of paper fibers included in the first sheet of previously-manufactured paperboard are generally aligned.

24. The method of claim 17, wherein the forming surface of the die further defines a plurality of ridges which alternate with the plurality of grooves, wherein the plurality of ridges are elongated and extend parallely in the longitudinal direction, wherein each ridge of the plurality of ridges defines an elongated apex extending longitudinally from proximate to the entrance end rearward to proximate the exit end, and a curved leading edge at the entrance end, and wherein the plurality of ridges are staggered such that as the forming surface is traversed in a lateral direction from a central ridge of the plurality of ridges, the curved leading edge of each successively encountered ridge of the plurality of ridges is farther rearward of the curved leading edge of the central ridge.

25. The method of claim 24, wherein the plurality of grooves and the plurality of ridges cooperate to define a multi-cycle sinusoidal shape such that, in an end elevational view of the die the plurality of grooves in combination with the plurality of ridges define a multi-cycle sinusoidal shape.

26. The method of claim 25, wherein each groove of the plurality of grooves defines a length and a width, wherein the width is substantially constant along the length.

27. The method of claim 25, wherein the plurality of forming members are a plurality of ridges of a second die, wherein the second die is generally planar and includes
 a forward entrance end,
 a rearward exit end, wherein the longitudinal direction is defined in a direction defined from the entrance end toward the exit end, and
 a broad forming surface for contacting the sheet material, and wherein the forming surface of the second die defines the plurality of ridges and a plurality of grooves, all of which are alternating, elongated and extend parallely in the longitudinal direction,
 wherein each ridge of the plurality of ridges defines
  an elongated apex extending longitudinally from proximate to the entrance end rearward to proximate the exit end, and
  a curved leading edge at the entrance end, wherein the plurality of ridges are staggered such that as the forming surface is traversed in a lateral direction from a central ridge of the plurality of ridges, the curved leading edge of each successively encountered ridge of the plurality of ridges is farther rearward of the curved leading edge of the central ridge, and wherein the plurality of grooves and the plurality of ridges cooperate to defines a multi-cycle sinusoidal shape such that, in an end elevational view of the second die the plurality of grooves and the plurality of ridges define a multi-cycle sinusoidal shape.

28. The method of claim 27, wherein the orienting step includes a step of orienting the first die and the second die such that ridges of the plurality of ridges of the first die extend toward grooves of the plurality of grooves of the second die, and ridges of the plurality of ridges of the second die extend toward grooves of the plurality of grooves of the first die.

29. The method of claim 28, wherein the sheet of previously-manufactured paperboard is a first sheet of previously-manufactured paperboard and defines a first surface, and where the method of fabricating containerboard further comprises a step of securing a second sheet of previously-manufactured paperboard to the first surface of the first sheet of previously-manufactured paperboard subsequent to the formation of the flutes on the first sheet of previously-manufactured paperboard.

30. An apparatus for fabricating corrugated containerboard from a previously-manufactured paperboard, the apparatus comprising:

a first die that is generally planar and includes,
- a forward entrance end,
- a rearward exit end, wherein a longitudinal direction is defined in a direction defined from said entrance end toward said exit end, and
- a broad forming surface extending in said longitudinal direction between said entrance end and said exit end, wherein said forming surface defines a plurality of grooves that are elongated and extend parallely in said longitudinal direction; and a drawing means for drawing said previously-manufactured paperboard past said first forming surface; and a forming means for slidingly contacting said previously-manufactured paperboard and forcing said previously-manufactured paperboard into contact with said first bringing surface in a manner that results in the fluting of said previously-manufactured paperboard,
- wherein said forming means includes a plurality of forming members,
- wherein said plurality of forming members are rigid, substantially non rotating, and longitudinally extending,
- wherein each forming member of said plurality of forming members includes
- a forward end and a rearward end and defines a length between said forward end and said rearward end,
  - wherein each forming member of said plurality of forming members extends generally parallel to and at least partially into a respective groove of said plurality of grooves to define a forming zone between said forming surface of said die and said plurality of forming members,
  - wherein said plurality of forming members are laterally and longitudinally offset such that as said plurality of forming members are traversed in a lateral direction from a central forming member of said plurality of forming members, said forward end of each successively encountered forming member of said plurality of forming members is farther rearward from said forward end of said central forming member,
- wherein said rearward end of each forming member of said plurality of forming members is disposed at approximately the same longitudinal position, and
- wherein each forming member of said plurality of forming members is constructed and arranged such that said previously-manufactured paperboard is directly contacted by substantially the entirety of said length of said each forming member.

31. The die of claim 30, wherein said first die and said plurality of forming members are substantially non-moving.

32. The die of claim 30, wherein each groove of said plurality of grooves defines a length and a width, wherein said width is substantially constant along said length.

33. The apparatus of claim 30, wherein said forming surface of said die further defines a plurality of ridges which alternate with said plurality of grooves,
- wherein said plurality of ridges are elongated and extend parallely in said longitudinal direction,
- wherein each ridge of said plurality of ridges defines an elongated apex extending longitudinally from proximate to said entrance end rearward to proximate said exit end, and
- a curved leading edge at said entrance end,
- wherein said plurality of ridges are staggered such that as said forming surface is traversed in a lateral direction from a central ridge of said plurality of ridges, said curved leading edge of each successively encountered ridge of said plurality of ridges is farther rearward of said curved leading edge of said central ridge, and
- wherein said plurality of grooves and said plurality of ridges cooperate to define a multi-cycle sinusoidal shape such that, in an end elevational view of said die said plurality of grooves and said plurality of ridges cooperate to define a multi-cycle sinusoidal shape.

34. The apparatus of claim 33, wherein said curved leading edge of each ridge of said plurality of grooves and ridges is rounded.

35. The apparatus of claim 33,
wherein said forming means includes a second die and said plurality of forming members of said forming means are a plurality of ridges of said second die,
- wherein said second die is generally planar and includes
  - a broad forming surface for contacting said previously-manufactured paperboard, wherein said forming surface is elongated and defines a longitudinal direction,
  - a forward entrance end, and
  - a rearward exit end, wherein said longitudinal direction is defined in a direction defined from said entrance end toward said exit end, and
- wherein said forming surface of said second die defines a plurality of grooves and ridges which are alternating, elongated and extend parallely in said longitudinal direction,
  - wherein each ridge of said plurality of grooves and ridges defines
    - an elongated apex extending longitudinally from proximate to said entrance end rearward to proximate said exit end, and
    - a curved leading edge at said entrance end,
  - wherein said plurality of grooves and ridges are staggered such that as said forming surface is traversed in a lateral direction from a central ridge of said plurality of grooves and ridges, said curved leading edge of each successively encountered ridge of said plurality of grooves and ridges is farther rearward of said curved leading edge of said central ridge, and
  - wherein said plurality of grooves and ridges cooperate to defines a multi-cycle sinusoidal shape such that, in an end elevational view of said second die said plurality of grooves and ridges define a multi-cycle sinusoidal shape,
wherein said forming surface of said first die faces said forming surface of said second die to define a forming zone between said forming surfaces, and
wherein said drawing means is for drawing said previously-manufactured paperboard through said forming zone such that said previously-manufactured paperboard is cooperatively contacted by said forming surface of said first die and said forming surface of said second die so as to define flutes in said paperboard.

36. The die of claim 35,
wherein each groove of said plurality of grooves of said first die defines a length and width, wherein said width is substantially constant along said length, and
wherein each groove of said plurality of grooves and ridges of said second die defines a length and a width, wherein said width is substantially constant along said length.

37. The apparatus of claim 35, wherein said drawing means includes,
- a first roll that is cylindrical and defines a first axis therethrough, and includes, a least, surface defining flutes that encircle said first roll and are oriented perpendicularly to said first axis, and
- a second roll that is cylindrical and defines a second axis therethrough, and includes, a least, a surface defining flutes that encircle said second roll and are oriented perpendicularly to said second axis, wherein said first roll and said second roll are in close proximity and define a nip therebetween.

38. The apparatus of claim 35, wherein ridges of the said plurality of ridges of said first die extend toward and at least partially into grooves of said plurality of grooves and ridges of said second die, and wherein ridges of said plurality of grooves and ridges of the second die extend toward and at least partially into grooves of said plurality of grooves of said first die.

* * * * *

UNITED STATES PATENT AND TRADEMARK OFFICE
CERTIFICATE OF CORRECTION

PATENT NO. : 5,508,083

DATED : April 16, 1996

INVENTOR(S) : Francis L. Chapman, Jr.

It is certified that error appears in the above-identified patent and that said Letters Patent is hereby corrected as shown below:

Column 15
Claim 30, line 16, the term "bringing" should read "forming"

Signed and Sealed this

Twenty-seventh Day of August, 1996

Attest:

BRUCE LEHMAN

Attesting Officer     Commissioner of Patents and Trademarks